April 11, 1967

H. ZINCKE ETAL 3,314,047

WARNING DEVICES FOR MOTOR VEHICLE BRAKE SYSTEMS

Filed July 16, 1964

INVENTORS
Helmut Zincke
Walter Koliander
By Donald P. Selwacki
Attorney

INVENTORS
Helmut Zincke
Walter Koliander
By Donald P. Selwicki
Attorney 3,314,047
WARNING DEVICES FOR MOTOR
VEHICLE BRAKE SYSTEMS
Helmut Zincke, Russelsheim am Main, and Walter Koliander, Hochheim am Main, Germany, assignors to General Motors Corporation, Detroit, Mich., a corporation of Delaware
Filed July 16, 1964, Ser. No. 383,145
Claims priority, application Germany, July 19, 1963, O 9,563
9 Claims. (Cl. 340—52)

This invention relates to warning devices for motor vehicle brake systems.

According to the invention a brake system warning device for monitoring a pair of hydraulic circuits in a fluid-operable brake system for a motor vehicle is responsive to the pressure differential between the hydraulic circuits and provides a signal when the pressure differential is disturbed.

The scope of the monopoly is defined by the appended claims; the invention and how it can be performed are hereinafter particularly described with reference to the accompanying drawings, in which:

FIGURE 1 schematically illustrates one embodiment of a brake system warning device according to the invention;

Figure 1:
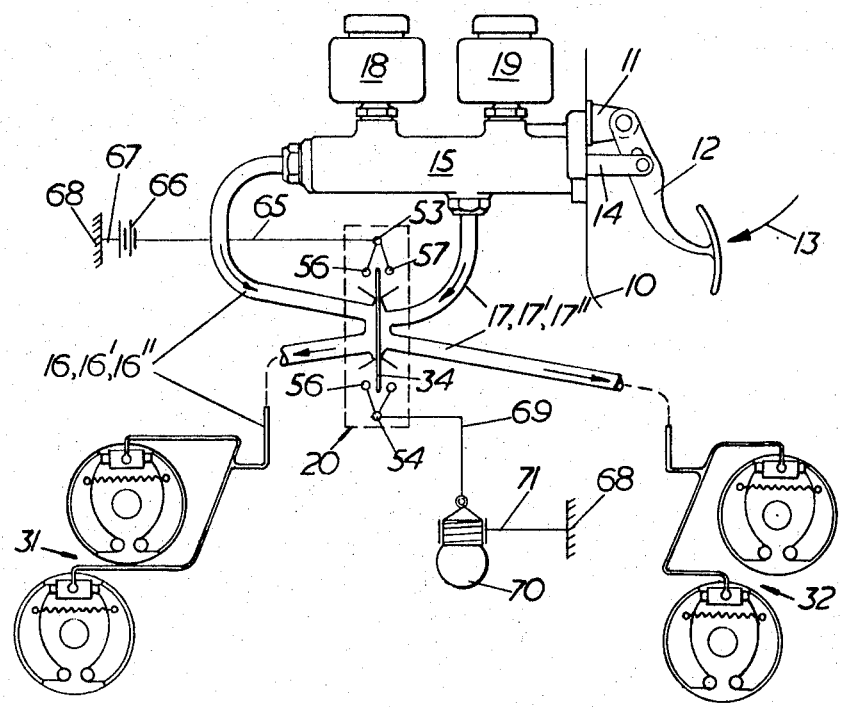
Figure 2:
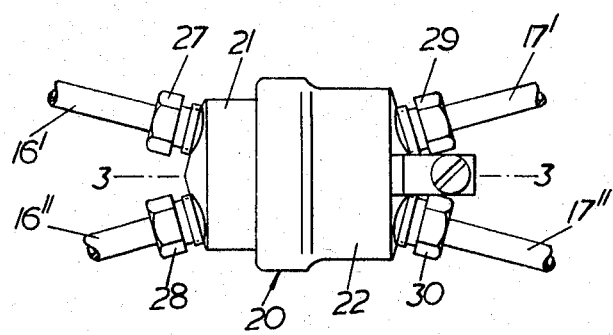
FIGURE 2 is an external view of a diaphragm switch forming part of the warning device shown in FIGURE 1.
Figure 3:
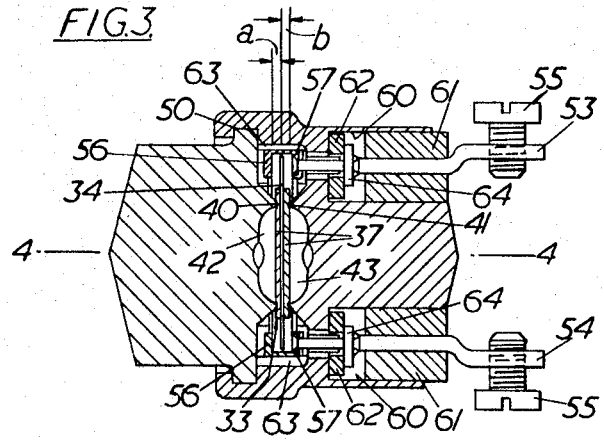
FIGURE 3 is an enlarged section through the diaphragm switch on the line 3—3 of FIGURE 2.
Figure 4:
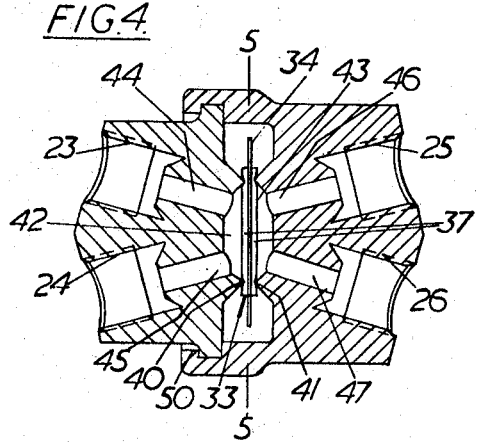
FIGURE 4 is a section through the diaphragm switch on the line 4—4 of FIGURE 3.

As shown in FIGURE 1, a brake pedal 12 is mounted at 11 on a front wall 10 of the passenger compartment of a motor vehicle. During braking, the pedal is depressed in the direction of arrows 13, and the pedal effort is transmitted through a push rod 14 to the piston (not shown) of a tandem-type brake master cylinder 15. This master cylinder 15 produces hydraulic pressures in a front brake pressure circuit 16 consisting of brake lines 16′ and 16″ and in a rear brake pressure circuit 17 consisting of brake lines 17′ and 17″. The pressure in the lines 16′ and 16″ is delivered to brakes 31 for the front axle, and the pressure in the lines 17′ and 17″ is delivered to brakes 32 for the rear axle, the brake system thus being a dual-circuit system. Reservoirs 18 and 19 contain brake fluid for the hydraulic circuits. The lines 16′ and 16″, 17′ and 17″ are connected in the manner illustrated to a diaphragm switch 20 which is shown in more detail in FIGURES 2 to 5. The arrangement used allows both hydraulic circuits to be bled without difficulty.

Figure 5:
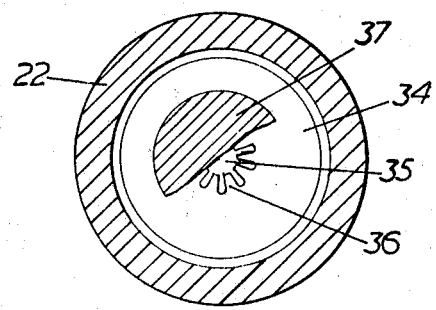
FIGURE 5 is a section on the line 5—5 of FIGURE 4.

The diaphragm switch 20 consists of two half-casings 21 and 22. Each half is provided with two internally threaded bores 23 and 24, 25 and 26, for corresponding screw connections 27 and 28, 29 and 30. A diaphragm 33 is located between the two half-casings 21 and 22. As shown in FIGURE 5, the diaphragm 33 consists of a contact disc 34 having a central cavity 35 bounded by radially extending finger portions 36 of the disc. Both sides of the contact disc 34 are overlaid by sealing discs 37. The interiors of both half-casings 21 and 22 possess annular pivot edges 40 and 41 which seal off respective pressure chambers 42 and 43 into which the bores 44 and 45, 46 and 47 debouch. In this way, the pressure chambers 42 and 43 at the two sides of the diaphragm 33 are connected to the hydraulic circuits 16 and 17 of the braking system.

When the two half-casings 21 and 22 are joined together, by means of a knurled union 50, the pivot edges 40 and 41 press into the sealing discs 37 so that an elastic clamping of the diaphragm 33 is obtained in simple manner. Two electrical contact tabs 53 and 54 provided at their outer ends with screws 55 extend into bores 60 in the half-casings 21 and 22 and are held in position in the bores by insulator members 61, 62 and 63 and by rivets 64.

The inner extremities of the contact tabs 53 and 54 are formed as contact arms 56 and 57 which are U-shaped in cross-section, and surround the outer rim of the contact disc 34 with spaces $a$ and $b$ between. If the operating pressures in the pressure circuits 16 and 17 are to be equal, the spaces $a$ and $b$ will also be equal, but if a higher operating pressure is chosen for the hydraulic circuit 16 of the front wheel brakes 31, the space $a$ will be made greater than the space $b$.

The spaces $a$ and $b$ may either be set by the manufacturer without possibility of variation or—if desired in certain applications—alternatively be made externally adjustable by some simple device.

In the embodiment shown in FIGURE 1, the contact tab 53 is connected through a lead 65 to a battery 66 which has a connection through a lead 67 to a body portion 68 of the vehicle. The contact tab 54 is connected via a lead 69 to an electric bulb 70 which has a connection via a lead 71 likewise to the body portion 68, and which is conveniently arranged on the instrument panel of the vehicle within the field of vision of the driver. Other modes of connection could however alternatively be used if desired. Instead of the bulb 70, some other kind of signal, i.e., a buzzer, could be used.

The warning device operates as follows:

When the brake pedal 12 is depressed, equal pressures are produced in the hydraulic circuits 16 and 17, and so no deformation of the diaphragm 33 takes place and the electric bulb 70 remains without current. However, if for example brake fluid has escaped from the line 17‴, the hydraulic circuit 17 does not attain its design pressure during braking. The pressure ratio between the hydraulic circuits 16 and 17 is thereby disturbed, and the diaphragm 33 consequently deflects about the annular pivot edges 40 and 41. If this deflection attains an inadmissibly high value, the outer rim of the contact disc 34 touches the contact arms 56 and 57 and thus forms a current bridge. The circuit of the warning device is consequently closed, and the electric bulb 70 lights up to indicate that the pressure differential has been disturbed.

For simplicity the diaphragm switch 20 could alternatively be made integral with the brake master cylinder 15, within a single casing, thereby avoiding the need for the lines 16′ and 17′ and their connections, e.g., 27 and 29, and further enhancing the safety of the system.

We claim:

1. A brake system warning device for monitoring pressures in a pair of hydraulic circuits of a fluid-operable brake system for a motor vehicle, comprising a housing, a pair of coaxially spaced annular pivot edges of equal diameter projecting from opposed internal faces of the housing, a diaphragm which is of larger diameter than the pair of annular pivot edges and is clamped by said pivot edges coaxially therebetween, connecting means extending from the interior of said housing for connecting each side of said diaphragm to a respective one of said pair of hydraulic circuits, a switch contact member engageable by a rim portion of said diaphragm when the diaphragm responds to disturbance of said pressure differential, and an electrical warning circuit connected to said switch contact member to provide a warning signal when said rim portion of said diaphragm engages said switch contact member.

2. A brake system warning device for monitoring pressures in a pair of hydraulic circuits of a fluid-operable brake system for a motor vehicle, comprising a housing, a pair of coaxially spaced annular pivot edges of equal diameter projecting from opposed internal faces of the housing, a diaphragm which is of larger diameter than the pair of annular pivot edges and is clamped by said pivot edges coaxially therebetween, connecting means extending from the interior of said housing for connecting each side of said diaphragm to a respective one of said pair of hydraulic circuits, an opposed pair of switch contact members engageable by a rim portion of said diaphragm when the rim portion moves in either direction in response to disturbance of said pressure differential, and an electrical warning circuit connected to said switch contact member to provide a warning signal when said rim portion of said diaphragm engages said switch contact member.

3. A brake system warning device according to claim 2, wherein the housing is in two parts and each part has connecting means extending from the interior thereof for connecting the respective side of said diaphragm to a corresponding one of said pair of hydraulic circuits.

4. A brake system warning device according to claim 3, including means for adjusting the position of said switch contact members in either axial direction relatively to said diaphragm.

5. A brake system warning device according to claim 2, wherein the diaphragm has a central cavity bounded by radially extending finger portions of the diaphragm, and is overlaid at both sides by sealing discs which seal off the cavity.

6. A brake system warning device according to claim 5, wherein the sealing discs are of resilient material and effect resilient clamping of the diaphragm between the annular pivot edges.

7. A brake system warning device for monitoring the pressures in a pair of hydraulic circuits of a fluid-operable brake system for a motor vehicle, comprising a housing, a pair of coaxially spaced annular pivot edges of equal diameter projecting from opposed internal faces of the housing, a diaphragm which is of larger diameter than the pair of annular pivot edges and has a central cavity bounded by radially extending finger portions of the diaphragm, a pair of resilient sealing discs which overlie the diaphragm at both sides and are engaged by the pair of annular pivot edges to resiliently clamp the diaphragm coaxially between said pivot edges and to seal off said cavity, connecting means extending from the interior of said housing for connecting each side of said diaphragm to a respective one of said pair of hydraulic circuits, an opposed pair of switch contact members engageable by a rim portion of said diaphragm when the rim portion moves in either direction in response to disturbance of said pressure differential, and an electrical warning circuit which is connected to said switch contact member to cause an electric current to traverse the diaphragm and thereby complete the circuit to provide a warning signal when said rim portion of said diaphragm moves in either direction into engagement with said switch contact members.

8. A motor vehicle brake system and warning device, comprising front and rear vehicle wheel brakes, a driver-operable tandem brake master cylinder, a pair of hydraulic brake actuator circuits interconnecting the tandem brake master cylinder and the respective wheel brakes for application of said wheel brakes by actuation of said brake master cylinder, and a brake system warning device comprising a housing, a pair of coaxially spaced annular pivot edges of equal diameter projecting from opposed internal faces of the housing, a diaphragm which is of larger diameter than the pair of annular pivot edges and has a central cavity bounded by radially extending finger portions of the diaphragm, a pair of resilient sealing discs which overlie the diaphragm at both sides and are engaged by the pair of annular pivot edges to resiliently clamp the diaphragm coaxially between said pivot edges and to seal off said cavity, connecting means extending from the interior of said housing for connecting each side of said diaphragm to a respective one of said pair of hydraulic circuits, an opposed pair of switch contact members engageable by a rim portion of said diaphragm when the rim portion moves in either direction in response to disturbance of said pressure differential, an electrical warning circuit which is connected to said switch contact member to cause an electric current to traverse the diaphragm and thereby complete the circuit to provide a warning signal when said rim portion of said diaphragm moves in either direction into engagement with said switch contact members, and an electric bulb which is energizable by the warning signal provided by said electrical warning circuit when the pressure differential between said hydraulic circuits is disturbed.

9. A motor vehicle brake system and warning device, comprising front and rear vehicle wheel brakes, a driver-operable tandem brake master cylinder, a pair of hydraulic brake actuator circuits interconnecting the tandem brake master cylinder and the respective wheel brakes for application of said wheel brakes by actuation of said brake master cylinder, and a brake system warning device comprising a housing, a pair of coaxially spaced annular pivot edges of equal diameter projecting from opposed internal faces of the housing, a diaphragm which is of larger diameter than the pair of annular pivot edges and has a central cavity bounded by radially extending finger portions of the diaphragm, a pair of resilient sealing disc portions of the diaphragm, a pair of resilient sealing disc which overlie the diaphragm at both sides and are engaged by the pair of annular pivot edges to resiliently clamp the diaphragm coaxially between said pivot edges and to seal off said cavity, connecting means extending from the interior of said housing for connecting each side of said diaphragm to a respective one of said pair of hydraulic circuits, an opposed pair of switch contact members engageable by a rim portion of said diaphragm when the rim portion moves in either direction in response to disturbance of said pressure differential, an electrical warning circuit which is connected to said switch contact member to cause an electric current to traverse the diaphragm and thereby complete the circuit to provide a warning signal when said rim portion of said diaphragm moves in either direction into engagement with said switch contact members, and an electric bulb which is energizable by the warning signal provided by said electrical warning circuit when the pressure differential between said hydraulic circuits is disturbed.

References Cited by the Examiner
UNITED STATES PATENTS 3,011,595  12/1961  Heiss et al. _____ 340—52 X
3,212,826  10/1965  Petty _____ 303—84

NEIL C. READ, *Primary Examiner.*

A. H. WARING, *Assistant Examiner.*